US005242044A

United States Patent [19]

Yamaguchi et al.

[11] Patent Number: 5,242,044

[45] Date of Patent: Sep. 7, 1993

[54] APPARATUS FOR ROTATING AND CONVEYING AN ARTICLE TO BE PAINTED ON COATING LINE

[75] Inventors: Shoichi Yamaguchi, Okazaki; Hisashi Shimizu, Tokorozawa, both of Japan

[73] Assignee: Tsubakimoto Chain Co., Osaka, Japan

[21] Appl. No.: 925,575

[22] Filed: Aug. 4, 1992

[30] Foreign Application Priority Data

Aug. 6, 1991 [JP] Japan .................................. 3-219328

[51] Int. Cl.[5] ................................ B65G 47/24

[52] U.S. Cl. .......................................... 198/377

[58] Field of Search .......................... 104/172.3, 172.2; 198/375, 377, 378

[56] References Cited

U.S. PATENT DOCUMENTS 2,598,163 5/1952 Halls .............................. 198/377 X
2,657,666 11/1953 Fowler ........................... 198/377 X
5,023,974 6/1991 Coles .............................. 198/377 X

FOREIGN PATENT DOCUMENTS 256162 10/1988 Japan .
159081 6/1989 Japan .

*Primary Examiner*—D. Glenn Dayoan
*Attorney, Agent, or Firm*—Howson and Howson

[57] ABSTRACT

In a carriage for conveying an article such as an automobile body on a coating line, a sprocket on the carriage engages an endless chain running along the path of carriage movement. The sprocket causes the article to rotate on an axis parallel to the direction of movement of the carriage. A pendulum weight is provided to cause the article normally to assume an upright condition. A lever on the sprocket shaft engages a cam as the sprocket approaches engagement with the endless chain, and causes the weight to swing in one direction. When the lever clears the cam, the weight returns by gravity, causing the sprocket to begin rotating so that it smoothly engages the chain without shock. The operation of the lever, cam and weight also impart rotation to article to be painted before the sprocket engages the chain, thereby eliminating shocks in the rotating movement of the article, which could otherwise cause sagging or running of the paint.

1 Claim, 4 Drawing Sheets

APPARATUS FOR ROTATING AND CONVEYING AN ARTICLE TO BE PAINTED ON COATING LINE

BRIEF SUMMARY OF THE INVENTION

This invention relates to an apparatus, for use in a coating line, for conveying an article to be painted, such as an automotive body. It relates more particularly to improvements in an apparatus which both conveys and rotates the article in order to obtain a coating of uniform thickness and improved smoothness.

In painting an article such as an automobile body on a coating line, it has been found desirable to apply a thick coat of paint in order to reduce the number of coats to be applied and to improve the smoothness of the coated surface. To prevent sagging of the thick coat of paint, drying and baking are effected as the painted article is rotated while being conveyed along the coating line, as disclosed in laid-open Japanese Patent Applications No. 256162/1988 and No. 159081/1989.

Laid-open Japanese Patent Application No. 256162/1988 discloses a technique in which a balancing weight, as shown in FIGS. 8, 15 and 16 of the published application, is provided to align the center of gravity of an article to be painted with the center of rotation of the article, in order to prevent variations in the rate of rotation of the article. Laid-open Japanese Patent Application No. 159081/1989 discloses the use of a spiral spring, as shown in FIGS. 5 and 6 of the published application, in order to reduce shock as rotation of the article begins and thereby prevent runs or sags of the paint on the painted article from occurring as a result of shocks.

In the technique described above in which a balancing weight is used, since the center of rotation and center of gravity of the article to be painted nearly coincide, the article, e.g. the shell of an automobile body, will not necessarily stop in an upright attitude. It can be stopped at any attitude throughout its 360° of rotation, and it is possible to stop the article in an inverted or inclined attitude. Since the article is not necessarily upright when its rotation stops, it must be moved to an upright condition before it is unloaded from the carriage. Furthermore, in the case of the shell of an automotive body, when the shell is stopped in an inverted condition, sound deadening material on the interior floor of the body can drop off. Another disadvantage of the prior-art techniques, is that the spiral spring mounting structure for alleviating shocks is complicated. Still another disadvantage is that the shock absorbing function of the spiral spring structure is reduced as elasticity of the spring deteriorates, so that, after passage of time, the desired effect is not achieved.

The general object of the invention is to provide a simple carriage mechanism for a coating line which overcomes the above-described disadvantages of the prior art.

More specifically, one object of this invention is to provide a simple and reliable mechanism to eliminate shock as rotation of the article to be painted begins, and thereby avoid the deleterious effects of shock on the quality of the finish.

Another specific object of the invention is to eliminate the time and effort involved in bringing an article to an upright condition before removing it from the carriage of the coating line.

The invention addresses these objects by means of a swinging pendulum-type weight lever and a cam mechanism. The weight lever is suspended from an arm for rotating the article to be painted. The combined center of gravity of the rotating arm and the article is located below the axis of rotation. Rotation of the article is effected by means of an endless chain which travels parallel to the direction of travel of the carriage and operates a sprocket rotatably mounted on the carriage and drivingly connected to the article in order to effect rotation of the article. Ordinarily, if the non-rotating sprocket were to come into engagement with the chain, a sudden acceleration of the sprocket would occur. This would be transmitted to the article as a shock, which could have a deleterious effect on the quality of the coating. In accordance with the invention, an acceleration cam plate provided along the path of travel of the carriage engages an acceleration lever on the carriage, which causes the article to begin rotation before the sprocket engages the chain. Preferably, the swinging pendulum-type weight lever described above is forcibly but smoothly tilted by the action of the cam plate on the acceleration lever, and then released so that it swings downward under the force of gravity. This swinging motion imparts a rotation to the sprocket before it engages with the chain, so that the sprocket smoothly engages the chain. The preliminary rotation of the sprocket effected by the action of gravity on the pendulum-type weight is accompanied by rotation of the article to be painted, which is driven in rotation by the sprocket. This preliminary rotation of the sprocket and the article to be painted eliminates shocks likely to occur at the time of engagement of the sprocket with the chain.

When the sprocket on the carriage is disengaged from its chain, the article stops rotating, and will recover its erect attitude on its axis of rotation from any state of inclination by virtue of the action of gravity, since the combined center of gravity of the article and the pendulum-type weight is slightly below the axis of rotation of the article.

Further objects, advantages and details of the invention will be apparent from the following detailed description, when read in conjunction with the drawings.

DETAILED DESCRIPTION

Figure 1:
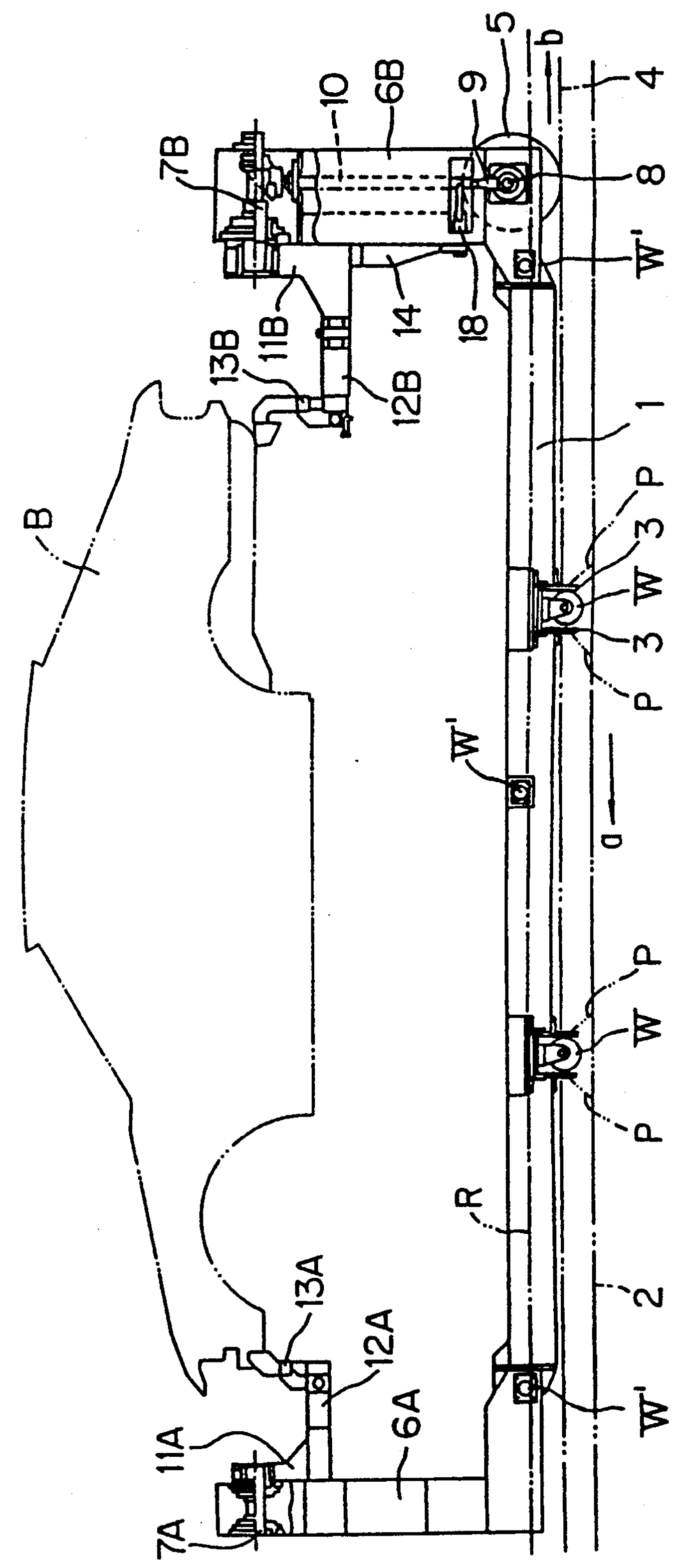
FIG. 1 is a side elevation of an automotive body rotating and conveying carriage.
Figure 2:
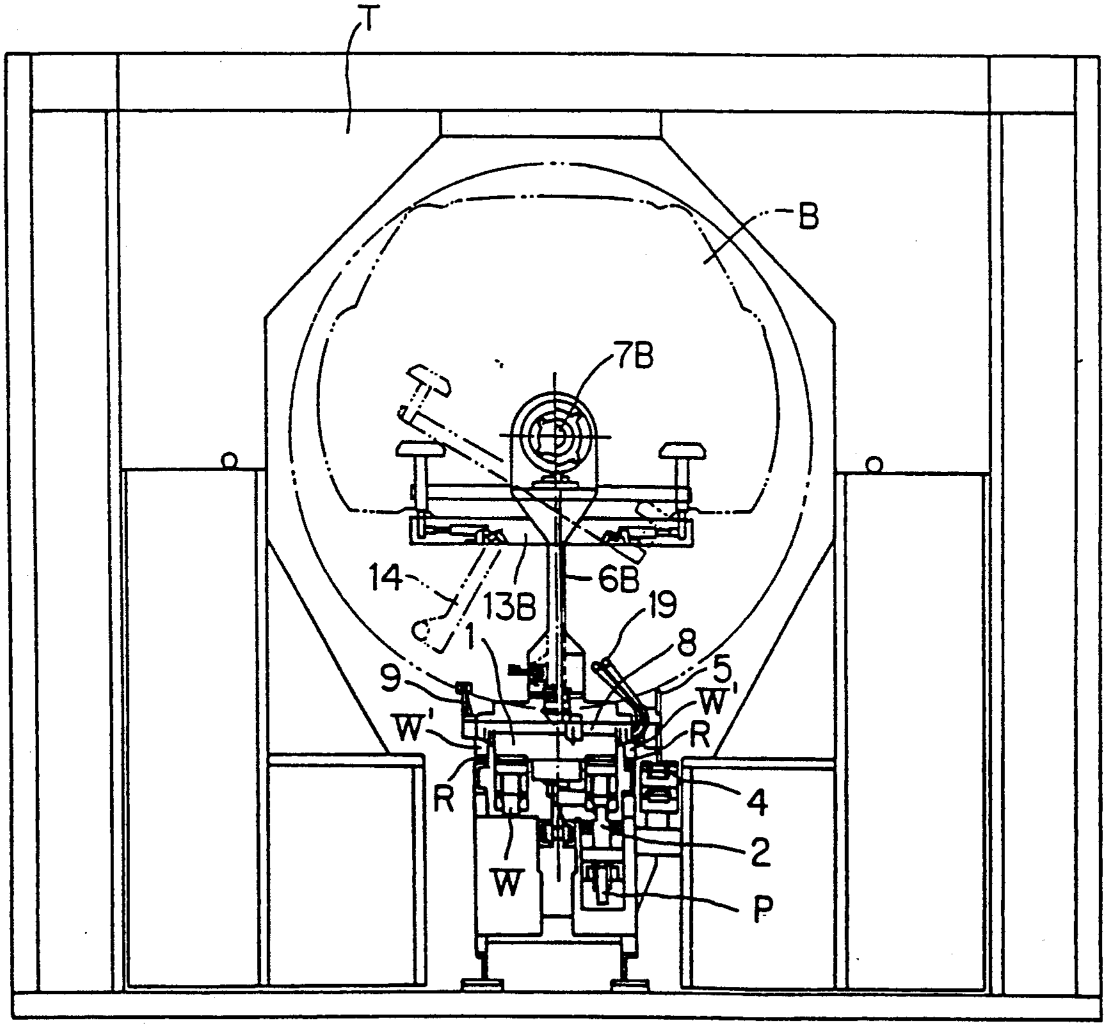
FIG. 2 is an end view of the carriage, as seen from the right side of FIG. 1, in a tunnel of a coating line.

As shown in FIGS. 1 and 2, the carriage 1 has a plurality of casters W to allow the carriage to be moved about on a floor. It also has a plurality of wheels W' for traveling on coating line rails R. Plates 3 are provided both ahead of and behind each caster W for engagement with pusher dogs P which are swingably mounted on a conveyor chain 2 for towing the carriage.

Conveyor chain 2 is an endless chain which travels in the direction of arrow a through the overall length of the coating line. In parallel with conveyor chain 2 there is juxtaposed an endless chain 4 for rotating an article to be painted. Chain 4 moves in the direction of the arrow b, through the overall length of the coating line. Chain 4 is engaged with a sprocket 5, which will be described later. Conveyor chain 2 and chain 4 have a relative speed difference. In the embodiment described, conveyor chains 2 and 4 move in opposite directions. However, in an alternative embodiment, they may be operated in the same direction.

As the conveyor chain for towing the carriage and the chain for rotating the article to be painted are both operating, rotation of the article to be painted will not stop if either chain stops. The article to be painted can be kept rotating even if the carriage stops, and movement of the carriage will effect rotation of the article even if movement of chain 4 stops. Since rotation of the article is maintained in either case, running and sagging of the thick coat of paint are prevented.

At the front and rear ends of the frame of carriage 1 there are provided box-type columns 6A and 6B, each of which has an upper and lower section connected by a narrower central part. In the upper sections of these box-type columns 6A and 6B, rotating shafts 7A and 7B, are supported on bearings on a common axis extending longitudinally, i.e. in the direction of movement of the carriage. At the rear of the frame, in the lower section of box-type column 6B, a cross shaft 8 is supported on bearings with its axis extending at a right angle to the direction of travel a of the carriage. A sprocket 5 is connected to one end of cross shaft 8 by means of a clutch (not shown) which is engaged and disengaged by a clutch operating lever 19. An accelerating lever 9 is fixed at the other end of the cross shaft. Cross shaft 8 is connected by a bevel gear driving mechanism 10 to rotating shaft 7B on the rear box-type column.

On the opposed ends of rotating shafts 7A and 7B there are mounted L-shaped support members comprising rotating arms 11A and 11B and support arms 12A and 12B. At the ends of support arms 12A and 12B remote from arms 11A and 11b, mounting brackets 13A and 13B are provided for supporting the front and rear ends of the article to be painted.

In FIG. 2, the carriage is shown within a tunnel T of a coating line.

When carriage 1 is engaged by conveyor chain 2 and towed along the conveyor line, as it enters the coating line, sprocket 5 engages with endless chain 4, and the article to be painted starts rotating by virtue of the fact that arm 11B is driven as sprocket 5 rotates. The article B to be painted, which is securely supported by arms 12A and 12B, travels forward in tunnel T while rotating on the common axis of shafts 7A and 7B.

A swinging pendulum-type weight lever 14 is suspended from arm 11B on the rotating shaft of the rear column of the carriage. (Alternatively, the weight lever can be installed on arm 11A on the front column.)

Figure 3:
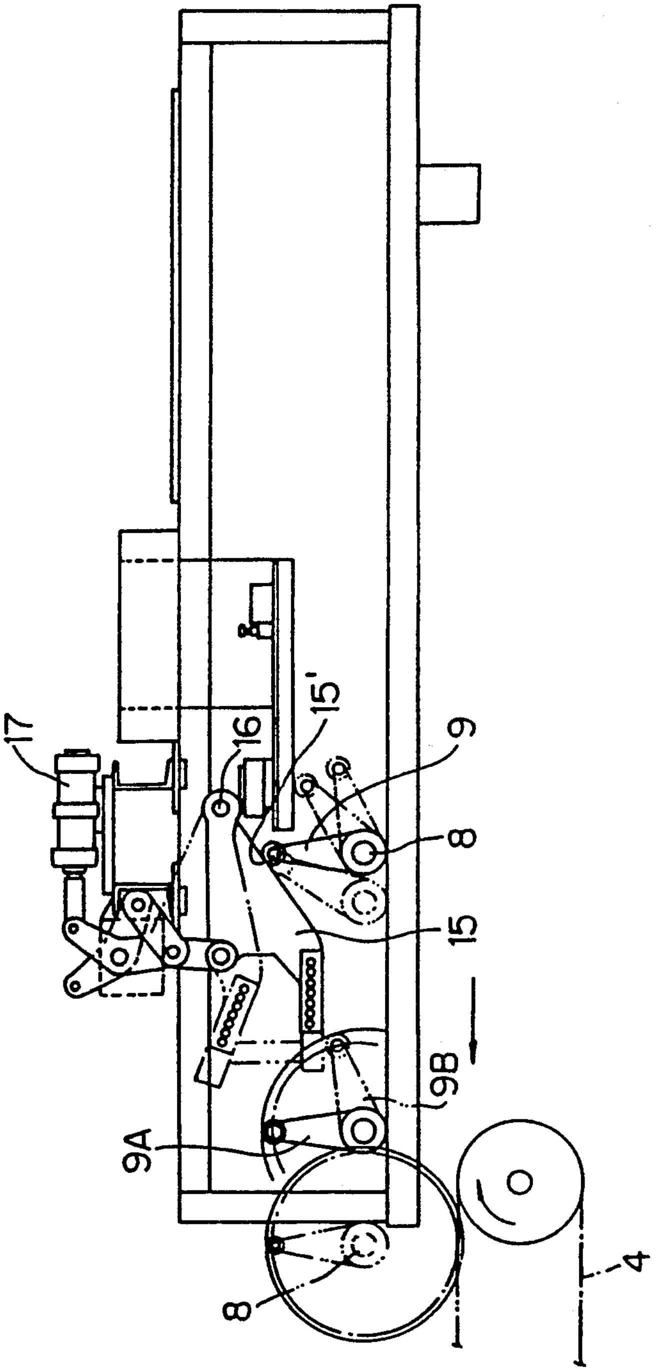
FIG. 3 is an enlarged side elevation of a major portion of a sprocket accelerating means in accordance with the invention.

Referring to FIG. 3, an accelerating cam plate 15 is installed at a position such that it is engageable by lever 9 before sprocket 6 engages chain 4. The cam plate tilts accelerating lever 9 and causes cross shaft 8 to rotate sprocket 5. The accelerating cam plate 15 is rotatable, about the shaft 16, between an operative position indicated by full lines and an inoperative position indicated a broken lines. Rotation of the cam plate is effected through a link mechanism by the a cylinder actuator 17.

With the cam plate in its operative position, as the carriage advances toward the left in FIG. 3, accelerating lever 9 is inclined rearward (clockwise in the drawing) by cam face 15', so that cross shaft 8 rotates clockwise. Shaft 7B rotates and causes the rotating support member and weight lever 14 to tilt upward from a condition in which lever 14 is vertical, through a predetermined angle as indicated by the broken line in FIG. 2. Tilting takes place gradually because of the gradual inclination of cam face 15'.

Figure 4:
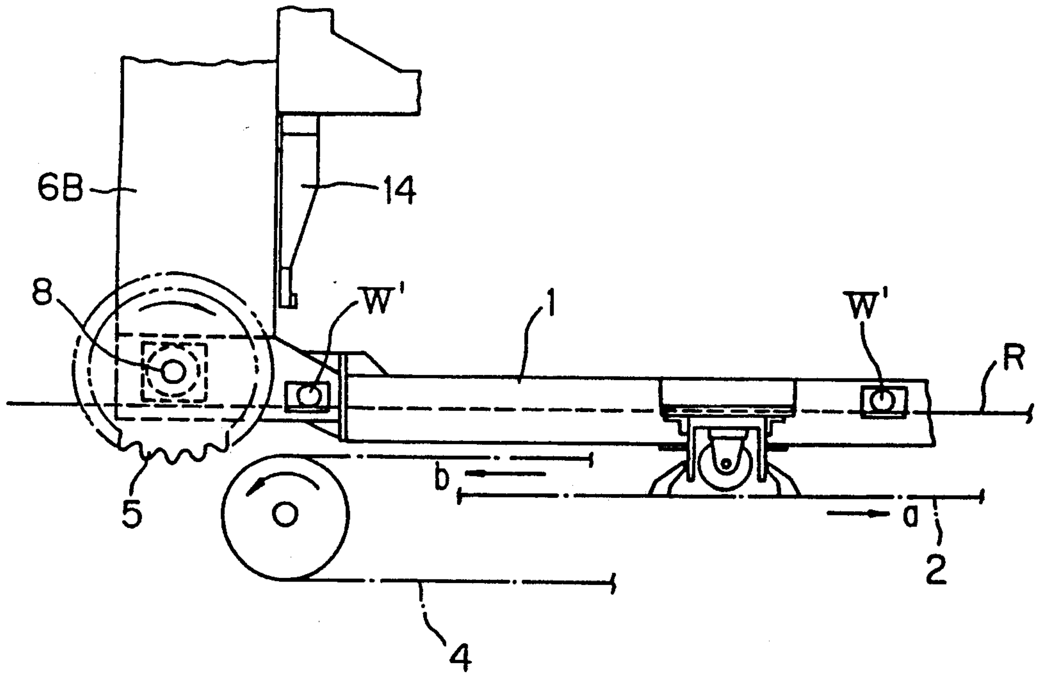
FIG. 4 is a schematic view explaining the engagement between a sprocket and a chain for rotating an article to be painted.

When accelerating lever 9 clears cam face 15', gravity causes weight lever 14 to return, in a swinging motion, from its inclined attitude to a vertical condition. As the weight lever moves in this direction, sprocket 5 rotates, clockwise in FIG. 4, in the direction indicated by an arrow on the sprocket. As the sprocket comes into engagement with chain 4, it is in rotation in the proper direction, and smoothly engages the chain, whereupon it continues to rotate in the same direction as a result of movement of the chain. The article to be painted, of course, also begins to rotate in the proper direction before the sprocket comes into engagement with the chain, and continues to rotate in the same direction after the sprocket engages the chain.

Since rotating movement is imparted to sprocket 5 before it comes into engagement with chain 4, it is shocks which would otherwise occur at time of engagement are alleviated. After engagement, the rotating arm and the swinging pendulum-type weight lever turn on the common axes of the rotating shafts by engagement with the sprocket, and article B is kept rotating.

In FIG. 3, reference numeral 9A refers to the position of the accelerating lever 9 when the swinging pendulum-type weight lever 14 is vertical, and article B to be painted is in its erect condition. Reference numeral 9B denotes the position of the accelerating lever 9 when the accelerating lever 9 has been tilted to its inclined condition by cam face 15' and the swinging pendulum-type weight lever 14 has been made to swing upward through a predetermined angle.

Lever 14 has a lock pin insertion hole (not shown) near its lower end. When the lever is suspended in its vertical condition, a lock pin 18 in the lower end section of column 6B is inserted into the insertion hole. The lock pin 18 is moved forward and backward by means of a pin-operating cam plate (not shown) positioned so that it is engaged by pin 18 immediately before lever 9 engages cam plate 15. Thus, just before carriage 1 enters the coating line, lock pin 18 is withdrawn from lock pin insertion hole by the pin-operating cam plate, and then accelerating lever 9 comes into contact with cam plate 15. With the lock pin 18 withdrawn, weight lever is easily rotated upward.

In the operation of the rotating and conveying apparatus in accordance with the invention, the article mounted on the carriage is always held in the erect attitude except when it is being rotated. When the carriage moves into the coating line, the weight lever is moved to an inclined condition by the accelerating cam plate, and when the accelerating lever 9 clears the cam plate weight lever swings by gravity through its vertical position and continues to rotate as the sprocket engages the endless chain for rotating the article to be painted. Because the sprocket is already rotating in the proper direction as it comes into engagement with the endless chain, engagement shocks are alleviated and as the rotation of the article to be painted is started smoothly, shocks which would cause sagging of a thick coat of paint are reduced or substantially eliminated. This significantly improves the smoothness and quality of the finish on the article.

We claim:

1. An apparatus for rotating and conveying an article on a coating line comprising:

a carriage having a frame with front and rear parts;

box-type columns mounted upright at the front and rear parts of said frame;

rail means for guiding said carriage for movement along a direction of travel;

means comprising a conveyor chain for towing said carriage along said rail means;

means on said carriage for releasably engaging said conveyor chain whereby said carriage can be towed by said conveyor chain;

means comprising an endless chain for rotating said article, said endless chain being arranged in parallel with said conveyor chain along said direction of travel, and said endless chain being movable at a speed different from that of said conveyor chain;

a cross shaft on said carriage, said cross-shaft being disposed, at a right angle with respect to the direction of travel of said carriage, in the rear part of the frame of said carriage;

a sprocket on said cross shaft, said sprocket being mounted at one end of said cross shaft and being engageable with said endless chain as the carriage moves along said rail means;

bearing means at the upper ends of the box-type columns on said carriage;

rotating shafts supported on the bearing means at the upper ends of the box-type columns, said shafts being aligned along an axis parallel to the direction of travel of the carriage frame;

means for connecting the rotating shaft supported at the upper end of the box-type column at the rear of the carriage in driving relationship to said cross shaft;

front and rear support arm means on the respective rotating shafts for removably supporting the lower parts of front and rear ends of said article, with its center of gravity positioned slightly lower than said axis;

a swinging pendulum-type weight lever suspended from said rear support arm;

an acceleration lever mounted on the other end of said cross shaft; and means comprising an acceleration cam plate, mounted along said rail means, said cam plate being engageable with said acceleration lever as said sprocket approaches the position at which it engages said endless chain, for rotating said acceleration lever through a specific angle, and causing said article to begin rotation before said sprocket engages said endless chain.

* * * * *

Adverse Decisions in Interference

Patent No. 5,242,044, Shoichi Yamaguchi, Hisashi Shimizu, APPARATUS FOR ROTATING AND CONVEYING AN ARTICLE TO BE PAINTED ON COATING LINE, Interference No. 103,705, final judgment adverse to the patentees rendered February 4, 1997, as to claim 1.

*(Official Gazette May 25, 1999)*

Adverse Decisions in Interference

Patent No. 5,242,044, Shoichi Yamaguchi, Hisashi Shimizu, APPARATUS FOR ROTATING AND CONVEYING AN ARTICLE TO BE PAINTED ON COATING LINE, Interference No. 103,705, final judgment adverse to the patentees rendered February 4, 1997, as to claim 1.

*(Official Gazette June 8, 1999)*